3,635,914
REACTIVE HYDROXYL GROUP-CONTAINING
VINYL CHLORIDE TERPOLYMERS
Wiley E. Daniels, Allentown, and Nathan D. Field, Easton, Pa., assignors to GAF Corporation, New York, N.Y.
No Drawing. Filed Dec. 24, 1969, Ser. No. 888,025
Int. Cl. C08f 15/40
U.S. Cl. 260—78.5 CIH      4 Claims

ABSTRACT OF THE DISCLOSURE

Reactive hydroxyl group-containing vinyl chloride terpolymers having the following formula:

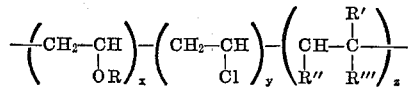

wherein R represents an alkyl group having from 1 to 18 carbon atoms, R' represents hydrogen or methyl, R" represents hydrogen, hydroxyalkyl or hydroxyalkyl carbalkoxy, and R''' represents hydroxy, hydroxyalkyl or hydroxyalkyl carbalkoxy, $x$ represents from about 50 to about 98 mole percent, $y$ represents from about 1 to about 40 mole percent and $z$ represents from about 1 to about 10 mole percent. The method of preparing the novel terpolymers by copolymerizing vinyl chloride, an alkyl vinyl ether and a polymerizable hydroxyl group-containing monomer in the presence of a free radical catalyst is also disclosed.

---

This invention relates to terpolymers and, more particularly, this invention relates to terpolymers of vinyl chloride which contain reactive hydroxyl groups.

There are known various copolymers of vinyl chloride which contain reactive hydroxyl groups. These copolymers find utility as coatings which are capable of cross-linking through the hydroxyl groups using standard cross-linking reagents. By cross-linking these copolymers in such a manner, they become permanently affixed to the substrate on which they are coated and are thus rendered highly durable and resistant to weathering, corrosion, solvent attack, and the like. These copolymers are produced usually by copolymerizing vinyl chloride with a hydroxyl group-containing monomer. Such monomers are typically hydroxyethyl or hydroxypropyl methacrylate. Another procedure which has been used is to copolymerize vinyl chloride and vinyl acetate and then saponify the acetate groups to provide secondary hydroxyl groups.

Such copolymers have inherent limitations due to the monomers used to produce the same. These limitations could be overcome, while retaining the desirable cross-linking properties, by producing a terpolymer of vinyl chloride, a hydroxyl group-containing monomer and a third co-monomer which will introduce the desired properties to the polymer. Such a third co-monomer which has many desirable properties is an alkyl vinyl ether. Thus, according to the present invention a terpolymer is produced of vinyl chloride, an alkyl vinyl ether and a hydroxyl group-containing polymerizable monomer. The products are derived from random terpolymerization to give products of the following general formula:

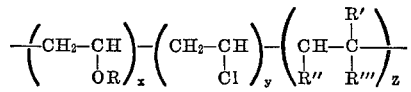

wherein R represents an alkyl group having from 1 to 18 carbon atoms, R' represents hydrogen or a methyl group, R" represents hydrogen, hydroxyalkyl or hydroxyalkyl carbalkoxy, and R''' represents hydroxy, hydroxyalkyl or hydroxyalkyl carbalkoxy, $x$ is from about 50 to about 98, $y$ is from about 1 to about 40, and $z$ is from about 1 to about 10.

It is therefore a primary object of the present invention to provide a vinyl chloride terpolymer having a reactive hydroxyl group.

It is another object of the present invention to provide a terpolymer of vinyl chloride and an alkyl vinyl ether having reactive hydroxyl groups.

It is yet another object of the present invention to provide a terpolymer of vinyl chloride, an alkyl vinyl ether and a hydroxyl group-containing polymerizable monomer.

Still further objects will become apparent as the following detailed description of the present invention proceeds.

In general, the terpolymer of the present invention is produced by copolymerizing vinyl chloride, an alkyl vinyl ether and a hydroxyl group-containing monomer under known polymerization conditions using a free radical initiator. The polymerization is conducted as an emulsion or suspension polymerization at a temperature between about 20 and about 40° C.

The alkyl vinyl ether has an alkyl group containing from 1 to 18 carbon atoms. These include, but are not limited to, the following:

| | |
|---|---|
| methyl vinyl ether | hexyl vinyl ether |
| ethyl vinyl ether | octyl vinyl ether |
| propyl vinyl ether | decyl vinyl ether |
| butyl vinyl ether | undecyl vinyl ether |
| isopropyl vinyl ether | dodecyl vinyl ether |
| isobutyl vinyl ether | hexadecyl vinyl ether |
| amylvinyl ether | octadecyl vinyl ether |

The hydroxyl group-containing monomer is, in general, any hydroxyl group-containing monomer having an unsaturation. The following are typical of such a monomer:

α-w-hydroxyalkyl vinyl ethers
hydroxyalkyl methacrylate esters
hydroxyalkyl fumarates
hydroxyalkyl maleates
2-butene-diol-1,4
vinyl acetate followed by saponification
N-methylol acrylamide, and methacrylamide.

In each of the foregoing classes of hydroxyalkyl compounds, the alkyl group could be of any desired length up to about 24 carbon atoms, but it has been found that for practical purposes it be from about 1 to 8 carbon atoms. Thus, the following compounds are illustrative of the hydroxyl group-containing monomers that can be used:

hydroxyethyl vinyl ether
2-hydroxy-n-propyl vinyl ether
4-hydroxybutyl vinyl ether
3-hydroxypropyl vinyl ether
hydroxyhexyl vinyl ether
hydroxyethyl methacrylate
hydroxybutyl methacrylate
hydroxyethyl fumarate
dihydroxyethyl fumarate
dihydroxyethyl maleate
2-butene-diol-1,4,
and the like.

As can be recognized from the foregoing discussion, vinyl acetate is clearly contemplated as a possible third monomer, and is included in the expression "hydroxyl group-containing monomer," since in terpolymers produced by its use as one of the monomers, some or all of the vinyl acetate groups may readily be converted to vinyl alcohol groups by saponification.

The catalysts or initiators employed in connection with the present invention include the common organic free radical initiators such as tertiary-butyl peroxy pivalate, ditertiarybutyl peroxide, diisobutyl peroxide, benzoyl peroxide, lauryl peroxide, organic azo compounds such as α,α-azodiisobutyronitrile and the like. Other free radical generating catalyst systems include potassium persulfate and other peroxides. As can readily be seen, the instant invention is not restricted to any particular catalyst. It is noted, however, that the catalyst should be a lower temperature initiator which furnishes free radicals rapidly below 70° C. and, preferably, in a range between about 20 and 60° C. The catalyst is used in a concentration sufficient to effect a substantially complete polymerization at a suitable reaction rate. In this regard, it is noted that an excess of catalyst does not have a particularly detrimental effect on the end product. However, such an excess should be controlled to the extent possible. The catalyst is generally employed in concentrations of up to about 1% by weight of the monomer.

It is preferred to conduct the polymerization at neutral and alkaline pH's, i.e., a pH of over about 7. In general, a pH of about 11.5 is quite satisfactory. In order to maintain this pH range, it is conventional to employ a buffer such as disodium hydrogen phosphate or the like. The pH can be initially raised to the proper level by use of sodium hydroxide or the like.

Conventionally, the reaction to produce the terpolymers of the present invention is run at a relatively low temperature, i.e., a temperature below about 70° C. A preferable range of temperature is from about 20 to about 60° C. and a still more preferred range is from about 30 to about 40° C.

Other ingredients commonly used in emulsion or suspension polymerization systems may also be included. Such ingredients include, for example, a surfactant such as sodium lauryl sulfate.

It will be appreciated by one skilled in the art that the conditions herein referred to may be varied from a particular suggested optimum figure either because the success of the process does not depend upon the maintenance of the condition with such exactitude, or because the alteration of a particular condition may be compensated for by the alteration of another condition operating concurrently.

A convenient screening test for cross-linkability is to react the terpolymer in solution with toluene diisocyanate and then air dry the films. These films on curing at about 150° C. for about 10 minutes are then tested by immersion in tetrahydrofuran and the degree of cross-linking is noted.

EXAMPLE 1

This illustrates the use of 4-hydroxybutyl vinyl ether as a source of functional hydroxyl groups in an iso-butyl-vinyl ether/vinyl chloride copolymer. The monomer ratios are HBVE/IBVE/VC:: 5/25/70.

To a liter autoclave was charged an aqueous phase consisting of 272.0 g. $H_2O$, 40.0 g. Stepanol WAC (sodium lauryl sulfate 30% active), 4.0 g. $Na_2HPO_4$ and 0.5 g. 50% NaOH (to give a pH of 11.5) and 2.0 g. $K_2S_2O_8$. The autoclave was evacuated and filled with nitrogen (repeated 3 times) and then the following charges made: 15.0 g. hydroxybutyl vinyl ether, 75.0 g. isobutyl vinyl ether, and 90.0 g. vinyl chloride. The autoclave temperature was adjusted to 30° C. and the present charge reacted for 5 hours. At this time there was added 120.0 g. vinyl chloride in 4 equal increments, allowing two hours reaction time at 30° C. for each. After a total of 24 hours, the autoclave was opened and a blue-white latex obtained of 45.4% solids, pH 10.6. This latex was coagulated with methanol and then water washed and vacuum dried.

The terpolymer contained 77% polyvinyl chloride and a hydroxy content of 1.2% as determined by acetylation. The solution viscosity ($\eta_{rel}$ 1.0 w./v. percent in toluene) was 1.47.

The terpolymer resin was dissolved in THF and toluene di-isocyanate added. The portions of polymer/TDI were 1:1 and one drop of dibutyltin-maleate added as thermal stabilizer. A film was cast on aluminum foil from this solution, air dried, then oven cured at 150° C. for 30 minutes. The cured terpolymer film was flexible, adhered to the aluminum film, and was insoluble in fresh THF.

EXAMPLE 2

This experiment illustrates the preparation of a reactive copolymer from 4-hydroxybutyl vinyl ether and vinyl chloride.

An aqueous phase consisting of 300 g. $H_2O$, 12 g. sodium lauryl sulfate, 4 g. $Na_2HPO_4$, 50% NaOH to pH 11.5, and 0.9 g. $K_2S_2O_8$ was reacted as in Example 1 with 10.0 g. 4-hydroxybutyl vinyl ether, and 90.0 g. vinyl chloride for 6 hours. The final latex (25% solids pH 7.45) was coagulated as in Example 1 to give a reactive copolymer resin containing 89% PVC, and a solution viscosity of 1.90 ($\eta_{rel}$ 1.0 w./v. percent THF).

The resin was dissolved in THF, dibutyltin-maleate added, and films cast on aluminum and air dried. These air dried films, after baking at 150° C. for 30 minutes, were observed to be flexible, and substantially unaffected by THF, showing a tendency to slight swelling. Thus, the copolymer at 10% HBVE content (2% hydroxyl) was substantially self-crosslinking.

EXAMPLE 3

This experiment illustrates the preparation of a 1-butyl vinyl ether-vinyl alcohol (from vinyl acetate)-vinyl chloride terpolymer by suspension polymerization and subsequent saponification of PVAC grouping.

To a pressure vessel was charged an aqueous phase consisting of 100.0 g. $H_2O$, 1.6 g. PVP/VAC copolymer (60% PVP/40% PVAC) as a protective colloid, and 15.0 g. $Na_2HPO_4$. The air was removed by evacuation and nitrogen filling. There was then added a solution of 75 g. isobutyl vinyl ether, 15 g. vinyl acetate and 3.0 g. Lupersol 11 (t-butyl peroxypivalate—75% active) and 90.0 g. vinyl chloride (uninhibited) and the temperature raised from 20 to 40°. This phase was reacted for 5 hours, after which time was added 120.0 g. vinyl chloride in 4 equal increments, allowing two hours for each increment to react. After a total of 24 hours, the reaction mixture, consisting of fine-grained terpolymer beads suspended in water, was filtered and the beads dried. The beads were added to a mixture of 1500 ml. methanol and 40 ml. concentrated sulfuric acid, heated with stirring and the methyl acetate formed was distilled off as methyl acetate and the methyl acetate-methanol azeotrope. The mixture was neutralized with concentrated sodium hydroxide solution and filtered to recovered beads. This product was cross-linked very easily with Cymel 301 (American Cyanamide hexa(methoxymethyl) melamine of the structure

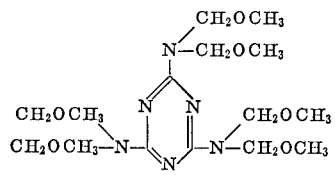

The solution viscosity was 1.29 ($\eta_{rel}$ 1.0 w./v. percent toluene). The amount of PVC by elemental analysis was 74%.

EXAMPLE 4

This example illustrates the use of hydroxyethylmethacrylate as the source of hydroxyl functionality.

The recipe and procedure of Example 3 were repeated with the exception that 15 g. of hydroxy-ethylmethacrylate was substituted for vinyl acetate. The terpolymer obtained as soft, filterable beads (0.1 mm. diameter) was soluble in a wide variety of solvents and could be cross-linked easily by the procedure of Example 1 to give cured products which were unaffected by immersion in THF. The terpolymer resin contained 0.75% primary hydroxyl groups and 73% PVC. The solution viscosity ($\eta_{rel}$ 1.0 w./v. percent toluene) was 1.6. A yield of 273 g. (91%), was realized.

EXAMPLE 5

This example illustrates the use of hydroxyethylmethacrylate as in Example 4, but in an emulsion system.

The recipe and procedure of Example 1 was repeated except that hydroxyethylmethylacrylate replaced hydroxybutyl vinyl ether as the source of hydroxyl functionality. The resultant latex, 600 g., contained 52% solids at pH 8. A test portion of copolymer isolated by coagulation and washing was composed of 70% PVC, 25% IBVE, and 4.7% HEMA by saponification. The solution viscosity (1.0 w./v. percent in toluene $\eta_{rel}$) was 1.70.

EXAMPLE 6

The use of dihydroxyethyl maleate as the source of hydroxyl functionality is illustrated in this example.

The procedure of Example 1 was repeated with the exception that dihydroxyethyl maleate replaced 4-hydroxybutyl vinyl ether as hydroxyl containing monomer. A latex, 620 g., was obtained, 53% solids and pH 8.0.

The terpolymer contained 71% PVC, 1.6% free hydroxy groups, and 23% isobutyl vinyl ether groups as shown by alkoxide determination.

Very highly cross-linked coatings were produced from this latex using the cross-linking procedure of Example 5. The cross-linked films were clear, tough, and possessed excellent adhesion to metals.

EXAMPLE 7

This example illustrates the use of 2-butenediol-1,4 as hydroxyl containing monomer.

The recipe of Example 1 was followed with the exception that the last increment of vinyl chloride, 30.0 g., contained 20.0 g. of 2-butene-1,4-diol and 0.5 g. ditertiarybutyl peroxide. The temperature of the mixture was raised to 125° C. and maintained for an additional 24-hour period to insure substantial conversion of the butenediol.

The latex obtained contained 52% solids and 0.3% residual monomer. The copolymer contained 2.1% free hydroxyl groups, and was very easily cross-linked by the procedure of Example 5.

What is claimed is:

1. The method of preparing a reactive hydroxyl group-containing vinyl chloride terpolymer, which method comprises copolymerizing
   (a) vinyl chloride
   (b) an alkyl vinyl ether wherein said alkyl moiety has from 1 to 18 carbon atoms, and
   (c) a polymerizable hydroxyl group-containing monomer, selected from the group consisting of α,ω-hydroxyalkyl vinyl ethers, hydroxyalkyl methacrylate esters, hydroxyalkyl fumarates, hydroxyalkyl maleates, 2-butene diol-1,4-N-methyl acrylamide, N-methylol methacrylamide, and saponified vinyl acetate, in the presence of a free radical catalyst, said vinyl chloride being present in an amount of about 1 to 40 mole percent, said alkyl vinyl ether being present in an amount of about 50 to 98 mole percent and said hydroxyl group-containing monomer being present in an amount of about 1 to 10 mole percent.

2. The method of claim 1, wherein said alkyl vinyl ether is isobutyl vinyl ether.

3. The method of claim 1, wherein said alkyl vinyl ether is 1-butyl vinyl ether.

4. A hydroxyl group-containing vinyl chloride terpolymer consisting essentially of:
   (a) vinyl chloride, about 1 to 40 mole percent,
   (b) an alkyl vinyl ether wherein said alkyl moiety is from 1 to 18 carbon atoms, about 50 to 98 mole percent; and
   (c) a polymerizable hydroxyl group-containing monomer selected from the group consisting of α,ω-hydroxyl vinyl ethers, hydroxyalkyl methacrylate esters, hydroxyalkyl fumarates, hydroxyalkyl maleates, 2-butene diol-1,4 N-methylol acrylamide, N-methylol methacrylamide, and saponified vinyl acetate, about 1 to 10 mole percent.

References Cited

UNITED STATES PATENTS

| | | | |
|---|---|---|---|
| 3,159,610 | 12/1964 | Slocombe et al. | 260—87.5 |
| 3,392,137 | 7/1968 | Slocombe | 260—33.6 |

JOSEPH L. SCHOFER, Primary Examiner

J. KIGHT, Assistant Examiner

U.S. Cl. X.R.

260—80.73, 80.75, 80.76, 80.81